US007264867B2

(12) United States Patent
Dontula et al.

(10) Patent No.: US 7,264,867 B2
(45) **Date of Patent: *Sep. 4, 2007**

(54) EXTRUDED TONER RECEIVER LAYER FOR ELECTROPHOTOGRAPHY

(75) Inventors: Narasimharao Dontula, Rochester, NY (US); Terry A. Heath, Caledonia, NY (US); Michael R. Brickey, Webster, NY (US); Mridula Nair, Penfield, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/999,254

(22) Filed: Nov. 30, 2004

(65) Prior Publication Data

US 2006/0115627 A1 Jun. 1, 2006

(51) Int. Cl.
*B32B 7/02* (2006.01)

(52) U.S. Cl. .................. 428/213; 428/195.1; 428/207; 428/213; 428/331; 428/474.7; 428/480; 428/500; 430/124; 430/126

(58) Field of Classification Search ............ 428/195.1, 428/213, 207, 331, 474.7, 480, 500; 156/230; 430/124, 126
See application file for complete search history.

(56) References Cited

U.S. PATENT DOCUMENTS

| | | | | |
|---|---|---|---|---|
| 4,958,173 | A | 9/1990 | Fitch et al. | |
| 4,968,578 | A | 11/1990 | Light et al. | |
| 5,104,731 | A | 4/1992 | Gager | |
| 5,142,327 | A * | 8/1992 | Kahle | 399/160 |
| 5,846,637 | A | 12/1998 | Malhotra et al. | |
| 6,217,708 | B1 | 4/2001 | Kurihara et al. | |
| 2002/0037176 | A1 | 3/2002 | Ogino et al. | |
| 2002/0058194 | A1 | 5/2002 | Williams et al. | |
| 2003/0082354 | A1 | 5/2003 | Nakamura et al. | |
| 2003/0082473 | A1 | 5/2003 | Nakamua et al. | |
| 2003/0141487 | A1* | 7/2003 | Lelental et al. | 252/500 |
| 2003/0175484 | A1 | 9/2003 | Shirokura et al. | |
| 2003/0186061 | A1* | 10/2003 | Murata et al. | 428/421 |
| 2003/0224192 | A1* | 12/2003 | Tani et al. | 428/485 |
| 2003/0234846 | A1* | 12/2003 | Koga et al. | 347/100 |
| 2003/0235683 | A1 | 12/2003 | Tamagawa et al. | |
| 2004/0058176 | A1 | 3/2004 | Nakamura et al. | |
| 2004/0248028 | A1* | 12/2004 | Tamagawa et al. | 430/124 |

FOREIGN PATENT DOCUMENTS

| | | |
|---|---|---|
| EP | 1 336 901 | 8/2003 |
| JP | 2000-3060 | 1/2000 |

OTHER PUBLICATIONS

U.S. Appl. No. 10/999,408, filed Nov. 30, 2004, Nair et al.
U.S. Appl. No. 10/999,411, filed Nov. 30, 2004, Nair et al.
U.S. Appl. No. 11/000,124, filed Nov. 30, 2004, Dontula et al.
U.S. Appl. No. 11/000,126, filed Nov. 30, 2004, Zaretsky et al.
U.S. Appl. No. 11/000,259, filed Nov. 30, 2004, Nair et al.
U.S. Appl. No. 11/000,299, filed Nov. 30, 2004, Jones et al.

* cited by examiner

*Primary Examiner*—B Shewareged
(74) *Attorney, Agent, or Firm*—Carl F. Ruoff

(57) ABSTRACT

The invention relates to a receiver sheet for electrophotography comprising a base material having thereon at least one toner receiver layer comprising a mixture of polyolefin and at least one member selected from the group consisting of polyolefin copolymers, amide containing polymers, and ester containing polymers, wherein a measured $T_g$ of said at least one receiver layer comprises a $T_g$ of less than 5° C.

24 Claims, No Drawings

EXTRUDED TONER RECEIVER LAYER FOR ELECTROPHOTOGRAPHY

FIELD OF THE INVENTION

The invention relates to a toner receiver member for electrophotographic printing. In a preferred form it relates to an imaging element comprising a toner receiver layer that is extruded as a monolayer onto a paper support and provides photographic quality print using electrophotography and is fuser oil absorbent, glossable, and fingerprint resistant and has good toner adhesion.

BACKGROUND OF THE INVENTION

The production of near photographic quality images using electrophotographic imaging technology is highly desirable. It is even more desirable to produce such images on substrates that render the print with the look and feel of a typical photographic print produced with silver halide imaging technology, such as the degree and uniformity of glossiness, stiffness and opacity, and high resolution and sharpness with corresponding low grain appearance. The advantages to producing photographic quality images on such substrates using digital electrophotography include improved environmental friendliness, ease of use, and versatility for customizing images, such as when text and images are combined.

U.S. Pat. No. 5,846,637 describes a coated xerographic photographic paper comprised of (1) a cellulosic substrate; (2) a first antistatic coating layer in contact with one surface of the substrate; (3) a second toner receiver coating on the top of the antistatic layer, and comprised of a mixture of a binder polymer, a toner spreading agent, a lightfastness inducing agent, a biocide, and a filler; and (4) a third traction controlling coating in contact with the back side of the substrate comprised of a mixture of a polymer with a glass transition temperature of from between about −50° C. to about 50° C., an antistatic agent, a lightfastness agent, a biocide and a pigment. This paper provides for the third layer on the backside of the substrate to receive toner, but this is not sufficient for ensuring high image quality should the image be created on this third layer instead of the second layer on the other surface of the substrate.

European Patent Application 1,336,901 A1 describes an electrophotographic image receiving sheet with a toner image receiving layer containing a release agent and formed on a support sheet for use in a fixing belt type electrophotography. The support used in the examples had a paper base with polyethylene layers on either side, where the image side is glossy and the backside has a matte finish. No provision is made for receiving the toner image on the backside.

U.S. Patent Application 2003/0082354 A1 discloses an image receiving sheet for electrophotography comprising a base paper and a toner image receiving layer comprising a thermoplastic resin and less than 40 percent by mass based on the thermoplastic resin, of a reinforcing filler pigment. The thermoplastic layer is infiltrated to a depth of 1 to 50 percent of the thickness of the base paper. It is desirable that the toner image receiving layer is substantially free of any pigment or filler in order to prevent blister formation and roughening of the toner image. The resin used for toner image receiving layer is preferably applied as a coating solution, the resins being soluble in water or dispersible in water and the solution's viscosity is preferred to be in the range of 10-300 mPa·sec. Similarly, U.S. Patent application 2003/0082473 A1 discloses use of a coating liquid whose solution viscosity is preferred to be in the range of 20-500 mPa·sec.

U.S. Patent application 2003/0037176 A1 discloses a electrophotographic transfer sheet that comprises a substrate having an image receiving layer that contains a thermoplastic resin as a main component, which has a melt viscosity at 120° C. of about 200 to 2,000 Pa-sec. This patent application discloses that if viscosity of the thermoplastic resin exceeds 2,000 Pa-sec, then burying of the color toner image receiving layer becomes insufficient and relief of the color toner image is formed on the surface which results in deterioration of gloss uniformity. The patent application also discloses coating methods like reverse roll coater, bar coater, curtain coater, die slot coater or gravure coater for creating the toner image receiving layer. The structure of the electrophotographic transfer sheet disclosed in this patent application has the toner image receiving layer only on one side.

U.S. Patent application 2004/0058176 A1 discloses a electrophotographic image receiving sheet where the toner receiver layer is coated on an polyethylene layer coated on a base. Though a whole host of polymers and methods for creating the toner image receiving layer have been listed, this patent application does not teach what are the necessary properties of a resin that satisfy a process like extrusion coating of resins as well as adhesion to toner. The patent application claims that the thermoplastic resin in the toner image receiving layer is a self dispersing water dispersible polyester resin emulsion that satisfies the following properties: number average molecular weight ($M_n$)=5000, molecular weight distribution (ratio of weight average molecular weight/number average molecular weight)≦4, glass transition temperature ($T_g$) in the range of 40° C.-100° C. and volume average particle diameter in the range of 20 nm-200 nm. Another claim made by the patent application is the toner image receiving layer may also contain a polyolefin resin and this layer may be extrusion coated.

U.S. Pat. No. 6,217,708 discloses a full color transfer paper for electrophotography, which does not have a toner image receiving layer coated on it. This method has a shortcoming since it results in photographs or images that show mottle of the paper and other paper defects.

U.S. Patent Application 2003/0175484 A1 discloses the creation of an image receiving sheet that has excellent gloss and has high offset resistance during a fixing step at a high temperature under high pressure. This is achieved by using a polyester resin containing at least 10% based on the molar number of polyhydric alcohol components of bisphenol A as a polyhydric alcohol component; and said polyester resin has an intrinsic viscosity (IV) of 0.3-0.7. This patent application does not discuss or claim about the branching of the polyester, neither does it discuss or claim the properties that enable extrusion coating.

U.S. Patent Application 2003/0235683 A1 discloses an electrophotographic image receiving sheet comprising a support and a toner image receiving layer containing a thermoplastic resin and a pigment disposed on the surface of the support wherein the surface of the support has a glossiness of 25 percent or more at 75° and a pigment content less than 40 percent by mass based on the mass of the thermoplastic resin. In this case also it is desirable that the toner image receiving layer be substantially free of any pigment or filler in order to prevent blister formation. Toner particle size also plays a key role in determining image quality in electrophotography, smaller particles generally yielding better image quality. However, as the particles get smaller, the physics of the forces holding the particles to the photoconductor changes drastically, needing new methods to effectively transfer them from the photoconductor to the receiver. Photographic quality prints can be produced with this process if very small toner particles are used. The drawback with small particles is the difficulty in transferring them onto plain paper. One solution to this problem is explained in U.S. Pat. No. 4,968,578, where the surface of the receiver sheets are coated with a thermoplastic layer.

There exists a need for improved toner receiver element for electrophotographic printing that can provide high gloss, where differential gloss, image relief, and residual surface fuser oil are minimized and toner adhesion is maximized. Further it is desirable that such prints be fingerprint and spill resistant. In all the patents and patent applications, the toner receiver element was manufactured using multiple manufacturing steps. There exists a need for reducing manufacturing steps in preparation of the toner receiver element which results in a low cost media. There also exists a need for creating low cost media for electrophotographic printing that can be created by polymer melt extrusion coating toner image receiver layers.

PROBLEM TO BE SOLVED BY THE INVENTION

There is a need for a receiver sheet where differential gloss is minimized after fusing.

SUMMARY OF THE INVENTION

It is an object of the invention to provide a toner receiver member for electrophotographic printing that produces near photoquality prints.

It is another object of the invention to provide a toner receiver member suitable for electrophotographic printing using an extrusion process.

These and other objects of the invention are accomplished by a receiver sheet for electrophotography comprising a base material having thereon at least one toner receiver layer comprising a mixture of polyolefin and at least one member selected from the group consisting of polyolefin copolymers, amide containing polymers, and ester containing polymers, wherein a measured $T_g$ of said at least one receiver layer comprises a $T_g$ of less than 5° C.

ADVANTAGEOUS EFFECT OF THE INVENTION

The invention provides a receiver with improved gloss after fusing.

DETAILED DESCRIPTION OF THE INVENTION

The invention has numerous advantages. The invention provides a toner receiver element for electrophotographic printing that can provide near photo quality high gloss prints, where differential gloss, image relief, and residual surface fuser oil are minimized and toner adhesion is maximized, exhibits fingerprint resistance and water resistance compared to commercially available clay coated papers. The toner receiver element also provides an excellent degree of whiteness. The invention provides material compositions for toner receiver layer that comprising a mixture of polyolefin and an ester containing polymer, wherein a measured $T_g$ of said at least one receiver layer comprises a $T_g$ of less than 5° C. The invention provides material compositions for toner receiver layer that comprising a mixture of polyolefin and an amide containing polymer, wherein a measured $T_g$ of said at least one receiver layer comprises a $T_g$ of less than 5° C. The invention provides a toner receiver layer composition consisting of a mixture or blends of polyolefins and polyamides, or a mixture or blend of polyolefins and polyester like a branched polyester or a blend of polyolefins and modified polyolefins. The invention further provides a toner receiver layer composition that can be applied as an extruded monolayer to the base without the necessity of a primer layer or a tie layer. The invention further provides compositions that can be extrusion coated at high speeds. The invention further provides compositions that are not tacky to touch and do not block. The invention further provides toner receiver layer compositions that absorb silicone oil put on the surface at the fuser. These and other advantages will be apparent from the detailed description below.

The toner receiver member of this invention comprises in order a support, at least one toner image receiver layer adjacent to the said support, wherein said at least one toner receiver layer comprises a layer of a mixture or blends of polyolefins and polyamides, or a mixture or blend of polyolefins and polyester like a branched polyester or a blend of polyolefins and modified polyolefins like polyolefin copolymers. The term "base" as used herein refers to a substrate material that is the primary part of an imaging element such as paper, polyester, vinyl, synthetic paper, fabric, or other suitable material for the viewing of images. The bases for use in the present invention may be any base typically used in imaging applications. Typical base may be fabrics, paper, and polymer sheets. The base may either be transparent or opaque, reflective or non-reflective. The term as used herein, "transparent" means the ability to pass radiation without significant deviation or absorption. Opaque base include plain paper, coated paper, synthetic paper, low density foam core based substrate and low density foam core based paper. The base can also consist of microporous materials such as polyethylene polymer-containing material sold by PPG Industries, Inc., Pittsburgh, Pa. under the trade name of Teslin®, Tyvek® synthetic paper (DuPont Corp.), impregnated paper such as Duraform®, and OPPalyte® films (Mobil Chemical Co.) and other composite films listed in U.S. Pat. No. 5,244,861. Transparent base include glass, cellulose derivatives, such as a cellulose ester, cellulose triacetate, cellulose diacetate, cellulose acetate propionate, cellulose acetate butyrate, polyesters, such as poly(ethylene terephthalate), poly(ethylene naphthalate), poly-1,4-cyclohexanedimethylene terephthalate, poly(butylene terephthalate), and copolymers thereof, polyimides, polyamides, polycarbonates, polystyrene, polyolefins, such as polyethylene or polypropylene, polysulfones, polyacrylates, polyether imides, and mixtures thereof. The papers listed above include a broad range of papers, from high end papers, such as photographic paper to low end papers, such as newsprint. The base used in the invention may have a thickness of from about 50 to about 500 μm, preferably from about 75 to 300 μM.

The imaging support of the invention can comprise any number of auxiliary layers, for example, functional layers. Such auxiliary layers may include tie layers or adhesion promoting layers, conveyance layers, barrier layers, splice providing layers, and UV absorption layers.

The polyolefin resin coated on the base to form a imaging support can be any melt extrusion coatable polyolefin material known in the art. Suitable polymers for the polyolefin resin coating include polyethylene, polypropylene, polymethylpentene, polystyrene, polybutylene, and mixtures thereof. Polyolefin copolymers, including copolymers of polyethylene, propylene and ethylene such as hexene, butene, and octene are also useful. The polyolefin may also be copolymerized with one or more copolymers including polyesters, such as polyethylene terephthalate, polysulfones, polyurethanes, polyvinyls, polycarbonates, cellulose esters, such as cellulose acetate and cellulose propionate, and polyacrylates. Specific examples of copolymerizable monomers include vinyl stearate, vinyl acetate, acrylic acid, methyl acrylate, ethyl acrylate, acrylamide, methacrylic acid, methyl methacrylate, ethyl methacrylate, methacrylamide, butadiene, isoprene, and vinyl chloride.

Polyethylene is preferred for resin coated paper supports, as it is low in cost and has desirable coating properties.

Preferred polyolefins are film forming and adhesive to paper. Usable polyethylenes may include high density polyethylene, low density polyethylene, linear low density polyethylene, and polyethylene blends. Polyethylene having a density in the range of from 0.90 g/$cm^3$ to 0.980 g/$cm^3$ is particularly preferred. The polyolefin resin, such as polypropylene, may be used when the support created is a laminated structure of paper and one or more biaxially or uniaxially oriented polypropylene films.

Any suitable white pigment may be incorporated in the polyolefin resin layers of the imaging base on support, such as, for example, zinc oxide, zinc sulfide, zirconium dioxide, white lead, lead sulfate, lead chloride, lead aluminate, lead phthalate, antimony trioxide, white bismuth, tin oxide, white manganese, white tungsten, and combinations thereof. The preferred pigment is titanium dioxide ($TiO_2$) because of its high refractive index, which gives excellent optical properties at a reasonable cost. The pigment is used in any form that is conveniently dispersed within the polyolefin. The preferred pigment is anatase titanium dioxide. The most preferred pigment is rutile titanium dioxide because it has the highest refractive index at the lowest cost. The average pigment diameter of the rutile $TiO_2$ is most preferably in the range of 0.1 to 0.26 μm. The pigments that are greater than 0.26 μm are too yellow for an imaging element application and the pigments that are less than 0.1 μm are not sufficiently opaque when dispersed in polymers. Preferably, the white pigment should be employed in the range of from about 7 to about 50 percent by weight, based on the total weight of the polyolefin coating. Below 7 percent $TiO_2$, the imaging system will not be sufficiently opaque and will have inferior optical properties. Above 50 percent $TiO_2$, the polymer blend is not manufacturable.

The surface of the $TiO_2$ utilized in the imaging base on support can be treated with an inorganic compounds such as aluminum hydroxide, alumina with a fluoride compound or fluoride ions, silica with a fluoride compound or fluoride ion, silicon hydroxide, silicon dioxide, boron oxide, boria-modified silica (as described in U.S. Pat. No. 4,781,761), phosphates, zinc oxide or, $ZrO_2$ and with organic treatments such as polyhydric alcohol, polyhydric amine, metal soap, alkyl titanate, polysiloxanes, or silanes. The organic and inorganic $TiO_2$ treatments can be used alone or in any combination. The amount of the surface treating agents is preferably in the range of 0.2 to 2.0% for the inorganic treatment and 0.1 to 1% for the organic treatment, relative to the weight of the titanium dioxide. At these levels of treatment, the $TiO_2$ disperses well in the polymer and does not interfere with the manufacture of the imaging support.

The polyolefin resins and $TiO_2$ and optional other additives utilized to create the imaging base may be mixed with each other in the presence of a dispersing agent. Examples of dispersing agents are metal salts of higher fatty acids such as sodium palmitate, sodium stearate, calcium palmitate, sodium laurate, calcium stearate, aluminum stearate, magnesium stearate, zirconium octylate, or zinc stearate higher fatty acids, higher fatty amide, and higher fatty acids. The preferred dispersing agent is sodium stearate and the most preferred dispersing agent is zinc stearate. Both of these dispersing agents give superior whiteness to the resin coated layer.

In addition, it may be necessary to use various additives such as colorants, brightening agents, antistatic agents, plasticizers, antioxidants, slip agents, or lubricants, and light stabilizers in the resin coated supports as well as biocides in the paper elements. These additives are added to improve, among other things, the dispersibility of fillers and/or colorants, as well as the thermal and color stability during processing and the manufacturability and the longevity of the finished article. For example, the polyolefin coating may contain antioxidants such as 4,4'-butylidene-bis(6-tert-butyl-meta-cresol), di-lauryl-3,3'-thiopropionate, N-butylated-p-aminophenol, 2,6-di-tert-butyl-p-cresol, 2,2-di-tert-butyl-4-methyl-phenol, N,N-disalicylidene-1,2-diaminopropane, tetra(2,4-tert-butylphenyl)-4,4'-diphenyl diphosphonite, octadecyl 3-(3',5'-di-tert-butyl-4'-hydroxyphenyl propionate), combinations of the above, and the like; heat stabilizers, such as higher aliphatic acid metal salts such as magnesium stearate, calcium stearate, zinc stearate, aluminum stearate, calcium palmitate, zirconium octylate, sodium laurate, and salts of benzoic acid such as sodium benzoate, calcium benzoate, magnesium benzoate and zinc benzoate; light stabilizers such as hindered amine light stabilizers (HALS), of which a preferred example is poly{[6-[(1,1,3,3-tetramethylbutylamino}-1,3,5-triazine-4-piperidinyl)-imino]-1,6-hexanediyl[{2,2,6,6-tetramethyl-4-piperdinyl) imino]}(Chimassorb 944 LD/FL).

The polyolefin resin coating utilized to create the preferred imaging support can include multilayer polyolefin structures, such as those achieved by multiple coatings, either sequential or via coextrusion. To minimize the number of resins required, a structure consisting of 1 to 3 layers on each side is preferred. In one embodiment of the present invention, at least one or all the layers can further comprise polyolefins. In a 3-layer structure, two of the three layers on each side may have substantially similar composition, preferably the two outside layers. The ratio of thickness of the center or layer adjacent to the base to an outside layer is in the range of 1 to 8 with 5 to 7 being most preferable. The polyolefin resin of the outside layers may contain, optionally, pigments and other addenda.

The coating of a paper base material with the polyolefin preferably is by extrusion from a hot melt as is known in the art. The invention may be practiced within a wide range of extrusion temperatures, for example, from 150° C. to 350° C., and speeds, for example, from 60 m/min. to 460 m/min., depending on the particular intended application of the support. For many applications, preferred extrusion temperatures are from 300° C. to 330° C.

The electrographic and electrophotographic processes and their individual steps have been well described in detail in many books and publications. The processes incorporate the basic steps of creating an electrostatic image, including charging and exposing a photoconductor, developing that image with charged, colored particles (toner), optionally transferring the resulting developed image to a secondary substrate, such as a cylinder with a rubber-like soft-elastic surface or a rubber blanket, and then transferring onto a final substrate or receiver and fixing or fusing the image onto the receiver. In terms of environmental stability and extending image quality, the intermediate transfer method is more desirable. The final receiver sheet of the invention can have a toner receiver layer designed to receive the toner particles.

It is known to fix the toner pattern to the toner receiver layer, the toner on the receiving sheet is subjected to heat and pressure, for example, by passing the sheet through the nip of fusing rolls. Both the toner polymer and the thermoplastic polymer of the toner receiver layer are softened or fused sufficiently to adhere together under the pressure of the fusing rolls. When both the toner receiver layer and the toner soften and fuse, the toner can be at least partially embedded in the thermoplastic toner receiver layer. For self-fixing toners, residual liquid is removed from the paper by air-drying or heating. Upon evaporation of the solvent these toners form a film bonded to the paper. For heat-fusible toners, thermoplastic polymers are used as part of the particle. Heating both removes residual liquid and fixes the toner to paper. The fusing step can be accomplished by the application of heat and pressure to the final image. Fusing can provide increased color saturation, improved toner adhesion to the receiver, and modification of the image surface texture. A fusing device can be a cylinder or belt. The fusing device can have an elastomeric coating which provides a conformable surface to enable improved heat transfer to the receiver. The fusing device can have a smooth or textured surface. The fusing step can be combined with the transfer step.

In forming toner images on conventional receiving sheets, the fusing and fixing of the toner to the sheet by the fusing rolls, creates gloss in the toned areas, i.e., in the so-called D max or black areas of the image. In the untoned areas, however, the so-called D min or white areas, no gloss is formed. In accordance with the present invention, however, when the toner-bearing receiver sheet is subjected to heat and pressure in the fusing roll nip, the entire surface of the sheet develops a substantially uniform gloss. The resulting electrophotographic image has the look and feel of a silver halide photographic print.

In a preferred embodiment, a belt fusing apparatus as described in U.S. Pat. No. 5,895,153 can be used to provide high gloss finish to the electrophotographically printed image receiver element of this invention. The belt fuser can be separate from or integral with the reproduction apparatus. In a preferred embodiment of the present invention, the belt fuser is a secondary step. The toned image is at first fixed by passing the electrophotographically printed sheet through the nip of fusing rolls within the reproduction apparatus and then subjected to belt fusing to obtain a high uniform glossy finish. The belt fusing apparatus includes an input transport for delivering marking particle image-bearing receiver members to a fusing assembly. The fusing assembly comprises a fusing belt entrained about a heated fusing roller and a steering roller, for movement in a predetermined direction about a closed loop path. The fusing belt is, for example, a thin metallic or heat resistant plastic belt. Metal belts can be electroformed nickel, stainless steel, aluminum, copper or other such metals, with the belt thickness being about 50.8 microns to 127 microns. Seamless plastic belts can be formed of materials such as polyimide, polypropylene, or the like, with the belt thickness summarily being about 50.8 to 127 microns. Usually these fusing belts are coated with thin hard coatings of release material such as silicone resins, fluoropolymers, or the like. The coatings are typically thin (1 to 10 microns), very smooth, and shiny. Such fusing belts could also be made with some textured surface to produce images of lower gloss or texture.

The belt fuser can have a pressure roller located in nip relation with the heated fusing roller. A flow of air is directed at an area of the belt run upstream of the steering roller and adjacent to the steering roller to cool such area. The cooling action provides for a commensurate cooling of a receiver member, bearing a marking particle image, while such member is in contact with the fusing belt. The cooling action for the receiver member serves as the mechanism to substantially prevent offset of the marking particle image to the pressure roller.

The belt fusing apparatus can be mounted in operative association with a belt tracking control mechanism.

High gloss finish can also be provided to the electrophotographically printed image receiver element of this invention by using calendering methods known in the art. Calendering is defined herein as a process in which pressure is applied to the imaged substrate, that has been preferably roller fused in the printing apparatus, by passing it between highly polished, metal rollers that are optionally heated, imparting a glossy, smooth surface finish to the substrate. The degree of pressure and heat controls the extent of gloss. Calendering differs from roller fusing in that the latter does not necessarily use highly polished rollers, is always carried out at high temperatures and the nip pressures are lower than those experienced at the calendering nip.

The toner used herein contains, for example, a polymer (a binder resin), a colorant and an optional releasing agent.

As the polymer, known binder resins are useable. Concretely, these binder resins include homopolymers and copolymers such as polyesters, styrenes, e.g. styrene and chlorostyrene; monoolefins, e.g. ethylene, propylene, butylene and isoprene; vinyl esters, e.g. vinyl acetate, vinyl propionate, vinyl benzoate and vinyl butyrate; $\alpha$-methylene aliphatic monocarboxylic acid esters, e.g. methyl acrylate, ethyl acrylate, butyl acrylate, dodecyl acrylate, octyl acrylate, phenyl acrylate, methyl methacrylate, ethyl methacrylate, butyl methacrylate and dodecyl methacrylate; vinyl ethers, e.g. vinyl methyl ether, vinyl ethyl ether and vinyl butyl ether; and vinyl ketones, e.g. vinyl methyl ketone, vinyl hexyl ketone and vinyl isopropenyl ketone. Particularly desirable binder resins include polystyrene resin, polyester resin, styrene/alkyl acrylate copolymers, styrene/alkyl methacrylate copolymers, styrene/acrylonitrile copolymer, styrene/butadiene copolymer, styrene/maleic anhydride copolymer, polyethylene resin and polypropylene resin. They further include polyurethane resin, epoxy resin, silicone resin, polyamide resin, modified rosin, paraffins and waxes. In these resins, styrene/acryl resins are particularly preferable.

As the colorants, known colorants can be used. The colorants include, for example, carbon black, Aniline Blue, Calcoil Blue, Chrome Yellow, Ultramarine Blue, Du Pont Oil Red, Quinoline Yellow, Methylene Blue Chloride, Phthalocyanine Blue, Malachite Green Oxalate, Lamp Black, Rose Bengal, C.I. Pigment Red 48:1, C.I. Pigment Red 122, C.I. Pigment Red 57:1, C.I. Pigment Yellow 97, C.I. Pigment Yellow 12, C.I. Pigment Yellow 17, C.I. Pigment Blue 15:1 and C.I. Pigment Blue 15:3. The colorant content is, for example, 2 to 8% by mass. When the colorant content is 2% or more by mass, a sufficient coloring power can be obtained, and when it is 8% or less by mass, good transparency can be obtained.

The toner utilized with the receiver of the present invention optionally contains a releasing agent. The releasing agents preferably used herein are waxes. Concretely, the releasing agents usable herein are low-molecular weight polyolefins such as polyethylene, polypropylene and polybutene; silicone resins which can be softened by heating; fatty acid amides such as oleamide, erucamide, ricinoleamide and stearamide; vegetable waxes such as carnauba wax, rice wax, candelilla wax, Japan wax and jojoba oil; animal waxes such as bees wax; mineral and petroleum waxes such as montan wax, ozocerite, ceresine, paraffin wax, microcrystalline wax and Fischer-Tropsch wax; and modified products thereof. When a wax containing a wax ester having a high polarity, such as carnauba wax or candelilla wax, is used as the releasing agent, the amount of the wax exposed to the toner particle surface is inclined to be large. On the contrary, when a wax having a low polarity such as polyethylene wax or paraffin wax is used, the amount of the wax exposed to the toner particle surface is inclined to be small.

Irrespective of the amount of the wax inclined to be exposed to the toner particle surface, waxes having a melting point in the range of 30 to 150° C. are preferred and those having a melting point in the range of 40 to 140° C. are more preferred.

The wax is, for example, 0.1 to 10% by mass, and preferably 0.5 to 7% by mass, based on the toner.

The toner used with the receiver of the present invention may contain an additive. Fine powders of inorganic compounds and fine particles of organic compounds are used as the additive. Fine particles of the inorganic compounds are those of, for example, $SiO_2$, $TiO_2$, $Al_2O_3$, CuO, ZnO, $SnO_2$, $Fe_2O_3$, MgO, BaO, CaO, $K_2O$, $Na_2O$, $ZrO_2$, $CaO.SiO_2$, $K_2O.(TiO_2)_n$, $Al_2O_3$ .2 $SiO_2$, $CaCO_3$, $MgCO_3$, $BaSO_4$ and $MgSO_4$. The fine particles of organic compounds are those of fatty acids and derivatives thereof and metal salts thereof, and also those of resins such as fluororesins, polyethylene resins and acrylic resins.

The average particle diameter of the toner used in the present invention is, for example, 3 to 15 micrometers, preferably 4 to 10 micrometers. The storage elastic modulus G' of the toner per se (determined at an angular frequency of 10 rad/sec) at 150° C. is preferably in the range of 10 to 200 Pa for good fusing.

The image receiver element of the present invention further comprises a toner receiver layer containing a polymer coated on both surfaces of the above mentioned support coated with a polyolefin resin. The toner receiver layer as mentioned earlier has the function of receiving an image-forming toner from a developing drum or an intermediate transfer medium by (static) electricity, pressure, etc. in the transferring step and fixing the image by heat, pressure, etc. in the fixing step. Further, it also enables the entire surface of the element develop a substantially uniform gloss after the fusing step, particularly after the belt fusing step. The resulting electrophotographic image has the look and feel of a silver halide photographic print. This is not possible on a commercially available standard paper since during the fusing step the thermoplastic is present only in the image areas leading to high differential gloss and difficulty in belt fusing due to differential adhesion forces of various areas of the print to the heated belt.

The toner receiver layer of the present invention generally has a dry coverage of 5 to 50 gm/$m^2$, or 8 to 35 gm/$m^2$ in a preferred embodiment for achieving minimum differential gloss and image relief.

The toner receiver layer of this invention comprises a thermoplastic polymer or thermoplastic blend of polymers or a component of the thermoplastic blend of polymers that has a glass transition temperature or $T_g$, or a melting point or $T_m$ that is close to that of the thermoplastic toner that is transferred to the toner receiver layer. The $T_g$ of the toner receiver layer or a component of the toner receiver layer should be within 25° C. of the $T_g$ of the toner and preferably is within 15° C. of the $T_g$ of the toner. The $T_m$ of a component of the toner receiver layer should be within 25° C. of the $T_g$ of the toner and preferably is within 15° C. of the $T_g$ of the toner. In the case of where only the resin component of the toner receiver layer has a $T_g$ close to the $T_g$ of the toner, then, the rest of the polymer matrix of the toner receiver layer should preferably have a significantly lower $T_g$ but is a semi-crystalline polymer. In such a case, the preferred polymer matrix of the toner receiver layer is a polyolefin. Consequently, both the toner and the receiving layers often soften or melt when the toner is fixed to the receiving layer by heat and pressure. This contributes to the adhesion of the toner to the layer and to achieving of high gloss in both the toned (D max) and untoned (D min) areas of the image resulting in unnoticeable differential gloss. High gloss and low differential gloss give the resultant prints a photo quality look and feel.

Materials useable for the toner receiver layer include a thermoplastic polymer or blends or mixtures of thermoplastic polymers which is capable of being deformed at the fixing temperature and also capable of receiving the toner and providing uniform gloss after fusing. The blends may be miscible or immiscible blends. It is preferred that the $T_g$ of a resin component of the toner receiver layer be less than 5° C., more preferably less than −15° C., most preferably less than −30° C. It is also preferred that at least one resin component of the toner receiver layer has a $T_g$ between 40° C. and 100° C. preferably between 40° C. and 85° C.; or a melting point ($T_m$) between 40° C. and 100° C. preferably between 40° C. and 85° C. More preferably, the $T_g$ of a resin component of the toner receiver layer or the $T_m$ of a resin component of the toner receiver layer is within 15° C. of the $T_g$ of the toner. When manufacturing a polymer blend there is a dispersed phase and a continuous phase. The continuous phase for this invention from here onwards is called the matrix polymer. In a preferred case, the matrix polymer is a polyester or polyolefin. More preferably the matrix polymer is a polyolefin and most preferably the polyolefin is polyethylene. Amongst polyethylenes most preferred is low density polyethylene. The choice of the matrix resin is determined by the choice of the support, so as to get good adhesion of the toner receiver layer to the support. One preferred support is raw paper base. In order to obtain good adhesion to paper without use of a primer or a tie layer the preferred polymer adhering to the paper is a polyolefin, more preferably polyethylene. If polyethylene is the matrix polymer in the toner receiver layer, then it is well known that its $T_g$ is lower than 5° C. It is less than −10° C. (*Polymer Handbook*, J. Brandrup, E. H. Immergut, 3rd edition, page V/19). If polypropylene is the matrix polymer its $T_g$ is also lower than 5° C.

Polymer blends of this invention for the toner receiver layer are so designed that they are not tacky to touch and furthermore they do not block. Tack is defined as the energy required to separate two objects not permanently bound together (*Science*, vol. 285, pg 1219-1220). Toner receiver members, created in this invention have low tack. If the toner receiver members have high tack, then it results in blocking of various layers of members on a master roll which is wound under tension, and also it results in blocking of various layers of members packed in a ream which results in difficulty in feeding of individual sheets. In order to optimize for absence of tack and good adhesion of the toner receiver layer to the base and good adhesion of the toner receiver layer to the toner, the volume fractions of blend constituents are adjusted. Specifically for the case of immiscible polymer blends, the polymer blend compositions of the toner receiver layer fulfill the following constraint $$\frac{\phi_1}{\phi_2} \geq \frac{\eta_1}{\eta_2}$$

where $\phi_1$ is the volume fraction of matrix polymer (continuous phase) and $\phi_2$ is the volume fraction of the dispersed phase (thermoplastic polymer which are blended into the matrix). $\eta_1$ and $\eta_2$ are the melt viscosities of the matrix polymer and the dispersed phase respectively in the above equation. As is well know in polymer blend literature, compatibilizers may be added to control the size of the dispersed phase as well as to further enhance the polymer blend properties. The choice of the compatibilizers will depend on choice of the dispersed phase. Some preferred compatibilizers are modified or functionalized polyolefins. Some preferred compositions of the invention that satisfy the constraint on volume fraction ratio as described by the above equation are that the weight percent of the dispersed phase should be between 3%-50%, more preferably 5%-30%.

For the dispersed phase in the toner receiver layer, the thermoplastic polymers for use with the invention polyolefin copolymers, amide containing polymers and ester containing polymers include, for example, polyester resins, polyurethane resins, polyamide resin, polyurea resin, polysulfone resin, polyvinyl chloride resin, polyvinylidene chloride resin, vinyl chloride/vinyl acetate copolymer resin, vinyl chloride/vinyl propionate copolymer resin, polyol resins such as polyvinyl butyral; and cellulose resins such as ethyl cellulose resin and cellulose acetate resin, polycaprolactone resin, styrene/maleic anhydride resin, polyacrylonitrile resin, polyether resins, epoxy resins and phenolic resins, polyolefin resins such as polyethylene resin and polypropylene resin; copolymer resins composed of an olefin such as ethylene or propylene and another vinyl monomer; and acrylic resins, polystyrene resins, styrene/butylacrylate copolymers, and mixtures thereof. The thermoplastic resins are preferably polyesters, acrylics, styrenics, styrene copolymer such as, styrene/acryl acid ester copolymers, styrene/methacrylic acid ester copolymers, and mixtures thereof. In many cases, since the above-mentioned resins and copolymers are used for forming the toner, the thermoplastic polymer included in the toner image-receiving layer preferably belongs to the same group as that of these resins and copolymers.

In a preferred embodiment, the present invention is directed to a toner receiver layer consisting of polymer blends or mixtures containing polyester, wherein the polyester is the dispersed phase. Preferably the polyester comprises (a) recurring dibasic acid derived units and diol derived units, at least 50 mole % of the dibasic acid derived units comprising dicarboxylic acid derived units containing an alicyclic ring comprising 4 to 10 ring carbon atoms, which ring is within two carbon atoms of each carboxyl group of the corresponding dicarboxylic acid, (b) 25 to 75 mole % of the diol derived units containing an aromatic ring not immediately adjacent to each hydroxyl group of the corresponding diol or an alicyclic ring, and (c) 25 to 75 mole % of the diol derived units of the polyester contain an alicyclic ring comprising 4 to 10 ring carbon atoms.

The polyester polymers used in the toner receiver layer composition of the invention are condensation type polyesters based upon recurring units derived from alicyclic dibasic acids (Q) and diols (L) and (P) wherein (Q) represents one or more alicyclic ring containing dicarboxylic acid units with each carboxyl group within two carbon atoms of (preferably immediately adjacent to) the alicyclic ring and (L) represents one or more diol units each containing at least one aromatic ring not immediately adjacent to (preferably from 1 to about 4 carbon atoms away from) each hydroxyl group or an alicyclic ring which may be adjacent to the hydroxyl groups.

For the purposes of this invention, the terms “dibasic acid derived units” and “dicarboxylic acid derived units,” or “dicarboxylic acids’ and “diacids,” are intended to define units derived not only from carboxylic acids themselves, but also from equivalents thereof such as acid chlorides, acid anhydrides, and esters for these acids, as in each case the same recurring units are obtained in the resulting polymer. Each alicyclic ring of the corresponding dibasic acids may also be optionally substituted, e.g. with one or more $C_1$ to $C_4$ alkyl groups. Each of the diols may also optionally be substituted on the aromatic or alicyclic ring, e.g. by $C_1$ to $C_6$ alkyl, alkoxy, or halogen. Regarding the polyol (including all compounds, diols, triols, etc. having two or more OH or OH derived groups), the total mole percentages for this component is equal 100 mol %. Similarly, regarding the acid component (including all compounds/units having two or more acid or acid-derived groups), the total mole percentages for this component is equal to 100 mole %.

In a preferred embodiment of the invention, the polyester of the toner receiver layer comprises alicyclic rings in both the dicarboxylic acid derived units and the diol derived units that contain from 4 to 10 ring carbon atoms. In a particularly preferred embodiment, the alicyclic rings contain 6 ring carbon atoms.

Such alicyclic dicarboxylic acid units, (Q), are represented by structures such as:

Q1:

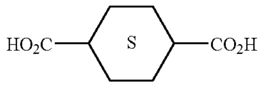

Q2:

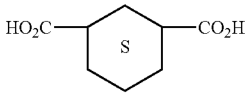

Q3:

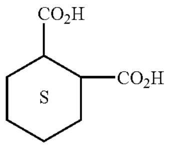

Q4:

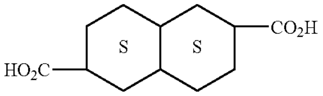

Q5:

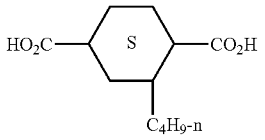

Q6:

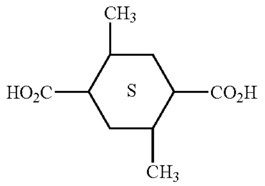

Q7:

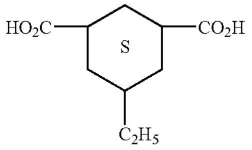

Q8:

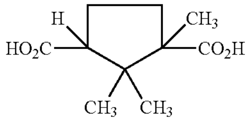

Q9:

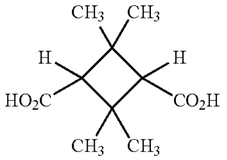

Q10:

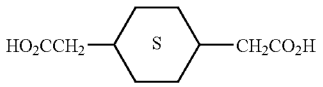

-continued
Q11:
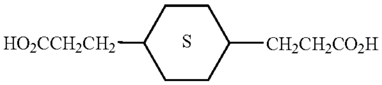
Q12:
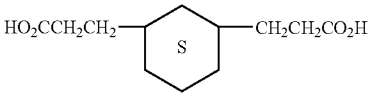
The aromatic diols, (L), are represented by structures such as:
L1:
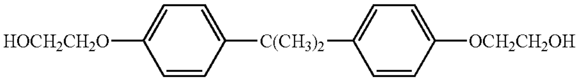
L2:
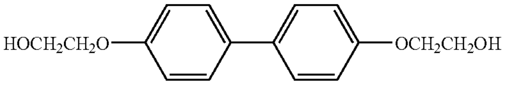
L3:
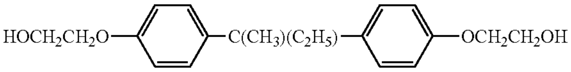
L4:
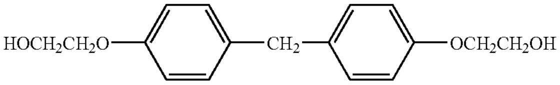
L5:
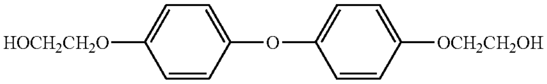
L6:
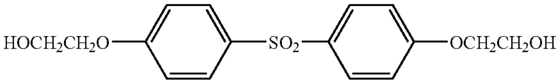
L7:
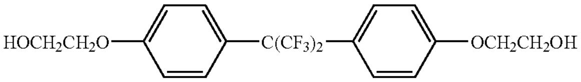
L8:
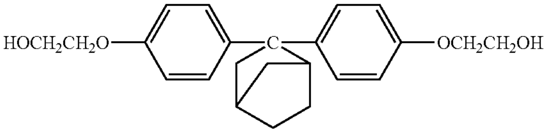
L9:
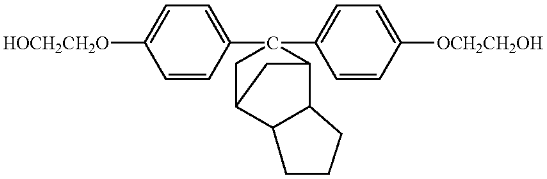
-continued
L10:
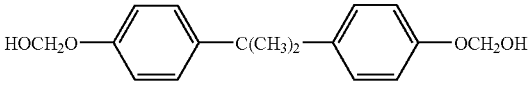
L11
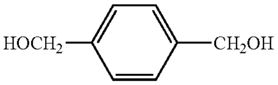
L12
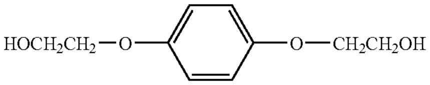
L13
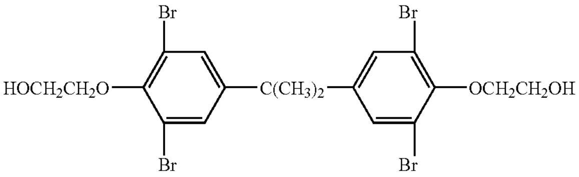
L14
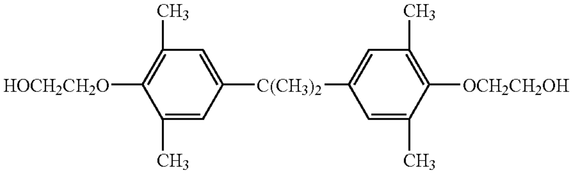
The alicyclic diols, (P), are represented by structures such as:
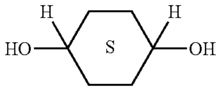
P1
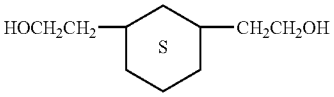
P2
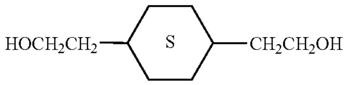
P3
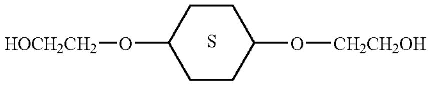
P4
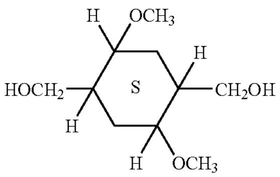
P5

-continued

P6

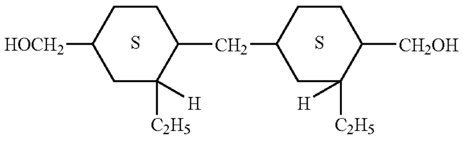

P7

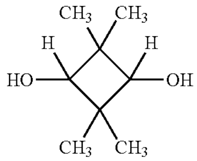

P8

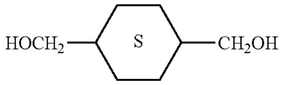

P9

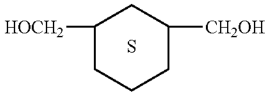

In the case of an extrudable polyester, it has been found advantageous to employ monomers (as a replacement for either a diacid and/or diol that has three or more functional groups, preferably one more multifunctional polyols (N) or polyacids and derivatives thereof (O) that can provide branching. Multifunctional polyols, for example, include glycerin, 1,1,1-trimethylolethane, and 1,1,1-trimethylolpropane, or combinations thereof. Polyacids having more than two carboxylic acid groups (including esters or anhydrides derivatives thereof) include, for example, trimellitic acid, trimesic acid, 1,2,5-, 2,3,6- or 1,8,4-naphthalene tricarboxylic anhydride, 3,4,4'-diphenyltricarboxylic anhydride, 3,4,4'-diphenylmethanetricarboxylic anhydride, 3,4,4'-diphenylethertricarboxylic anhydride, 3,4,4'-benzophenonetricarboxylic anhydride acid and derivatives thereof. Multifunctional polyols or anhydrides, for example, include compounds represented by structures such as:

N1

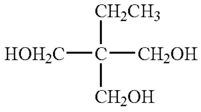

N2

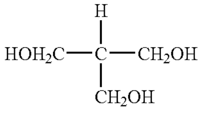

N3

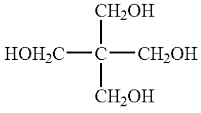

O1

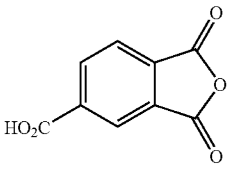

-continued

O2

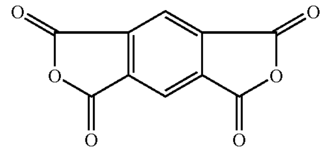

A small amount of aromatics, introduced by inclusion of aromatic diacids or anhydrides, is optional and is not preferred due to their tendency to reduce imaged dye density. Examples include, but are not limited to, terephthalic acid (S1) and isoterephthalic acid (S2).

Additional Diacids R and diols M may be added, e.g., to precisely adjust the polymer's $T_g$, solubility, adhesion, etc. Additional diacid comonomers could have the cyclic structure of Q or be linear aliphatic units or be aromatic to some degree. The additional diol monomers may have aliphatic or aromatic structure but are preferably not phenolic.

Some examples of suitable monomers for R include dibasic aliphatic acids such as:

R1: $HO_2C(CH_2)_2CO_2H$
R2: $HO_2C(CH_2)_4CO_2H$
R3: $HO_2C(CH_2)_7CO_2H$
R4: $HO_2C(CH_2)_{10}CO_2H$

Some examples of some other suitable monomers for M include diols such as:

M1: $HOCH_2CH_2OH$
M2: $HO(CH2)_3OH$
M3: $HO(CH_2)_4OH$
M4: $HO(CH_2)_9OH$
M5: $HOCH_2C(CH_3)_2CH_2OH$
M6: $(HOCH_2CH_2)_2O$
M7: $HO(CH_2CH_2O)_nH$ (where n=2 to 50)

The above-mentioned monomers may be copolymerized to produce structures such as:

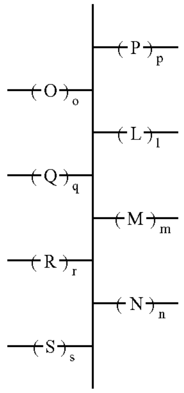

wherein o+q+r+s=100 mole percent (based on the diacid component) and p+m+n+l=100 mole percent (based on the polyol component). With respect to the diacid, preferably q is at least 50 mole percent, r is less than 40 mole percent, and s is less than 10 mole percent. With respect to the polyol, preferably p is 25 to 75 mole percent, l is 25 to 50 mole percent, and m is 0 to 50 mole percent. With respect to the polyfunctional monomers (having more than two functional groups), the total amount of n or o is preferably 0.1 to 10 mole percent, preferably 1 to 5 mole percent.

The polyesters utilized in the toner receiver layer of the invention preferably, except in relatively small amounts, do not contain an aromatic diacid such as terephthalate or isophthalate.

The following polyester polymers E-1 through E-14, comprised of recurring units of the illustrated monomers, are examples of polyester polymers usable in the toner image receiver layer of the invention.

E-1 through E-3: A polymer considered to be derived from 1,4-cyclohexanedicarboxylic acid, 1,4-cyclohexanedimethanol, 4,4'-bis(2-hydroxyethyl)bisphenol-A and 2-ethyl-2-(hydroxymethyl)-1,3-propanediol

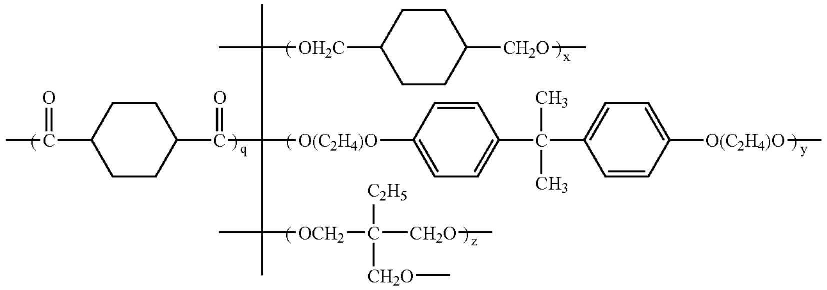

E-1: x = 49 mole % y = 50 mole % z = 1 mole %
E-2: x = 48 mole % y = 50 mole % z = 2 mole %
E-3: x = 47 mole % y = 50 mole % z = 3 mole %

E-4 through E-6: A polymer considered to be derived from 1,4-cyclohexanedicarboxylic acid, 1,4-cyclohexanedimethanol, 4,4'-bis(2-hydroxyethyl)bisphenol-A and glycerol

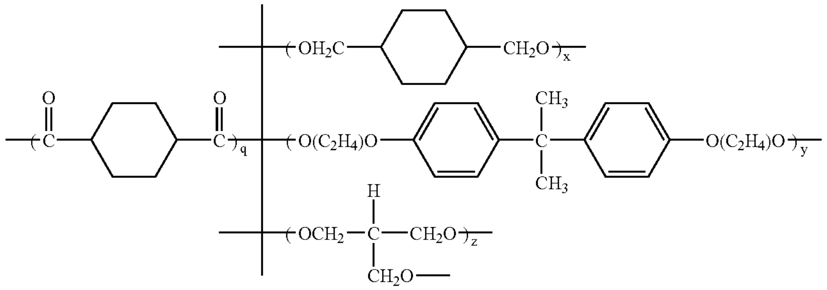

E-4: x = 49 mole % y = 50 mole % z = 1 mole %
E-5: x = 48 mole % y = 50 mole % z = 2 mole %
E-6; x = 47 mole % y = 50 mole % z = 3 mole %

E-7 through E-8: A polymer considered to be derived from 1,4-cyclohexanedicarboxylic acid, 1,4-cyclohexanedimethanol, 4,4'-bis(2-hydroxyethyl)bisphenol-A and pentaerythritol

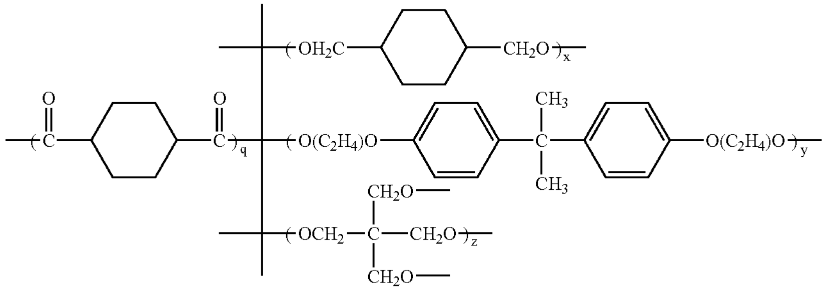

E-7: x = 49 mole % y = 50 mole % z = 1 mole %
E-8: x = 48 mole % y = 50 mole % z = 2 mole %

E-9 through E-11: A polymer considered to be derived from 1,4-cyclohexanedicarboxylic acid, trimellitic anhydride, 1,4-cyclohexanedimethanol and 4,4'-bis(2-hydroxyethyl)bisphenol-A.

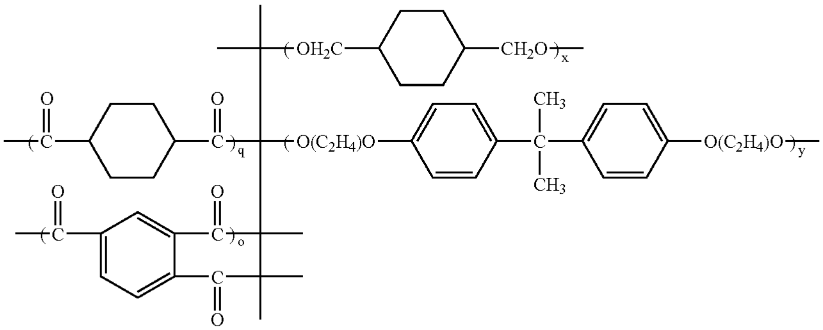

E-9: q = 98 mole % o1 = 2 mole % x = 50 mole % y = 50 mole %
E-10: q = 96 mole % o1 = 4 mole % x = 50 mole % y = 50 mole %
E-11: q = 94 mole % o1 = 6 mole % x = 50 mole % y = 50 mole %

E-12 through E-14: A polymer considered to be derived from 1,4-cyclohexanedicarboxylic acid, pyromellitic anhydride, 1,4-cyclohexanedimethanol and 4,4'-bis(2-hydroxyethyl)bisphenol-A.

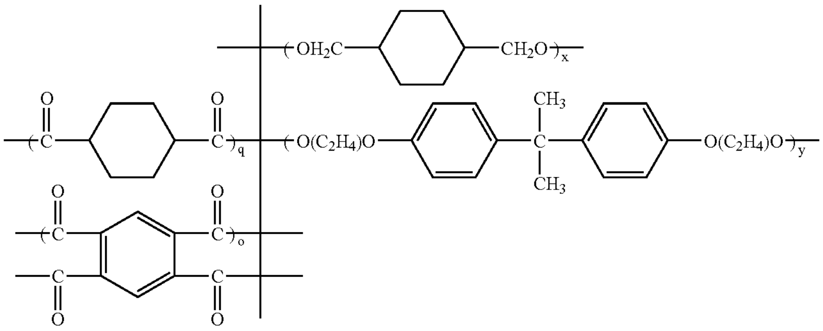

E-12: q = 98 mole % o2 = 2 mole % x = 50 mole % y = 50 mole %
E-13: q = 96 mole % o2 = 4 mole % x = 50 mole % y = 50 mole %
E-14: q = 94 mole % o2 = 6 mole % x = 50 mole % y = 50 mole %

Table 1 summarizes the various polyesters that are used as the binder in the toner image receiver layer in preferred embodiments of the invention.

TABLE 1

| Cmpd | Alicyclic Diacid Mole % Q | Anhydride Mole % O | Alicyclic Glycol Mole % X | Aromatic Glycol Mole % Y | Additional Glycol Mole % M | Branching Agent Mole % N1, N2, N3 |
|---|---|---|---|---|---|---|
| C-1 | 100 | 0 | 50 | 50 | 0 | 0 |
| C-2 | 100 | 0 | 30 | 50 | M2 = 20 | 0 |
| C-3 | 100 | 0 | 25 | 50 | M6 = 25 | 0 |
| E-1 | 100 | 0 | 49 | 50 | 0 | N1 = 1 |

TABLE 1-continued

| Cmpd | Alicyclic Diacid Mole % Q | Anhydride Mole % O | Alicyclic Glycol Mole % X | Aromatic Glycol Mole % Y | Additional Glycol Mole % M | Branching Agent Mole % N1, N2, N3 |
|---|---|---|---|---|---|---|
| E-2 | 100 | 0 | 48 | 50 | 0 | N1 = 2 |
| E-3 | 100 | 0 | 47 | 50 | 0 | N1 = 3 |
| E-4 | 100 | 0 | 49 | 50 | 0 | N2 = 1 |
| E-5 | 100 | 0 | 48 | 50 | 0 | N2 = 2 |
| E-6 | 100 | 0 | 47 | 50 | 0 | N2 = 3 |
| E-7 | 100 | 0 | 49 | 50 | 0 | N3 = 1 |
| E-8 | 100 | 0 | 48 | 50 | 0 | N3 = 2 |
| E-9 | 98 | O1 = 2 | 50 | 50 | 0 | 0 |
| E-10 | 96 | O1 = 4 | 50 | 50 | 0 | 0 |
| E-11 | 94 | O1 = 6 | 50 | 50 | 0 | 0 |
| E-12 | 98 | O2 = 2 | 50 | 50 | 0 | 0 |
| E-13 | 96 | O2 = 4 | 50 | 50 | 0 | 0 |
| E-14 | 94 | O2 = 6 | 50 | 50 | 0 | 0 |

The following examples for synthesizing a branched polyester composition for use in a toner-image receiver layer are representative of the invention, and other branched polyesters may be prepared analogously or by other methods known in the art.

Polyester E-3 (having the structural formula shown above under the Detailed Description of the Invention) was derived from a 70:30 cis:trans mixture of 1,4-cyclohexanedicarboxylic acid with a cis:trans mixture of 1,4-cyclohexanedimethanol, 4,4'-bis(2-hydroxyethyl)bisphenol-A and 2-ethyl-2-(hydroxymethyl)1,3-propanediol.

The following quantities of reactants were charged to a single neck side-arm 500 mL reactor fitted with a 38 cm head and purged with nitrogen: 1,4-cyclohexanedicarboxylic acid (86.09 g, 0.50 mol), 4,4'-bis(2-hydroxyethyl)bisphenol-A (79.1 g, 0.25 mol), 1,4-cyclohexanedimethanol (33.9 g, 0.235 mol), 2-ethyl-2-(hydroxymethyl)1,3-propanediol (2.0 g, 0.015 mol), monobutyltin oxide hydrate (0.5 g), and Irganox® 1010 pentaerythrityl tetrakis(3,5-di-tert-butyl-4-hydroxyhydro-cinnamate) from Ciba Specialty Chemicals (0.1 g). The flask was heated to 220° C. in a salt bath and continuously flushed with nitrogen for distillation of methanol. After two hours the calculated amount of methanol had been distilled and the temperature was raised to 240° C. for 30 minutes. Trioctylphosphate (7 drops) was added and the reaction was continued at this temperature for one and a half hours after which the temperature was increased to 275° C.

The flask was reconfigured for mechanical stirring and evacuation. The pressure was slowly reduced to 0.45 mm mercury over 15 minutes to allow excess glycol to distill. The progress of the reaction was monitored by measuring the millivolts (mv) required to maintain a constant torque of 200 RPM. The reaction was terminated when 190 mv was reached. The flask was cooled to room temperature, rinsed with water to remove salt from the reaction flask and then broken to remove the polymer. The polymer was cooled in liquid nitrogen, broken into half inch size pieces and ground in a Wiley Mill. The $T_g$ of the polymer was 54.1° C. and the molecular weight by size exclusion chromatography was 77,600.

Polymer E-2 (having the structure shown under the above Detailed Description) was derived from a 70:30 cis:trans mixture of 1,4-cyclohexanedicarboxylic acid with a cis:trans mixture of 1,4-cyclohexanedimethanol, 4,4'-bis(2-hydroxyethyl)bisphenol-A and 2-ethyl-2-(hydroxymethyl)1,3-propanediol.

The following quantities of reactants were charged to a 150 gallon reactor purged with nitrogen: 157.27 kg (913.38 mol) of cis/trans 1,4-cyclohexanedicarboxylic acid, 144.49 kg (456.69 mol) of 4,4'bis(2hydroxyethyl)bisphenol-A, 2.45 kg (18.27 mol) of 2-ethyl-2-(hydroxymethyl)1,3-propanediol, 65.12 kg (451.58 mol) of cis/trans 1,4-cyclohexanedimethanol, 335 gm of Irganox® 1010 pentaerythrityl tetrakis(3,5-di-tert-butyl-4-hydroxyhydro-cinnamate) from Ciba Specialty Chemicals and 82.51 gm of butylstannoic acid. Under nitrogen purge, the reactor was heated to 275° C. and maintained there for two hours. An internal temperature of 273° C. was reached after an additional two hours. At this point, the traps were drained and the drainings recorded. The reactor pressure was reduced to 2 mm Hg at 10 mm per minute. As the pressure passed 30 mm Hg, a solution of 62.3 gm of 85% phosphoric acid, 392.8 gm 1,4-cyclohexanedimethanol and 168.3 gm methanol was drawn into the reactor. After six and a half hours at 2 mm Hg the buildup was complete. The polymer was extruded from the reactor onto trays and left to cool overnight after which the solidified polyester was ground through a ¼ inch screen. The $T_g$ of the polymer was 56.9° C.; the $M_w$ was 129,000 and molecular weight distribution (MWD) was 10.7.

The polyester useful for the toner receiver layer in this invention preferably has a $T_g$ of from about 40 to about 100° C. In a preferred embodiment of the invention, the polyesters have a number molecular weight of from about 5,000 to about 250,000, more preferably from 10,000 to 100,000. The weight average molecular weight ($M_w$) of these branched polyesters is 80,000 to 250,000. Preferred weight average molecular weight of the branched polyesters is 105,000 to 130,000. The molecular weight distribution (MWD) as defined as ratio of $M_w$ to number average molecular weight ($M_n$) of these polyesters is 6-15. The preferred MWD is 8-12. The melt viscosity of these resins at 200° C. at a shear rate of 1 $sec^{-1}$ is in the range of 570 Pa-sec—3,500 Pa-sec. The melt strength of the branched polyesters was measured using a Rheotens, a melt tension apparatus provided by Gottfert. Other apparatuses similar to Rheotens can also be used to characterize melt strength. This test quantifies the resistance offered by resin during a melt stretching process. Melt tension or melt strength of the resin is determined by stretching a strand of polymer extruded out of a die between two counter-rotating wheels. The frequency of rotation of the wheels is increased by a preset acceleration and this results in the polymer strand being stretched. The pulling force measured in centinewtons (cN) during the stretching process is continuously recorded until the polymer strand breaks. The maximum force obtained before break of the strand is known as melt tension or melt strength of the polymer at the particular temperature. The foregoing procedure may be performed as described by M. B. Bradley and E. M. Phillips in the Society of Plastics engineers ANTEC 1990 conference paper (page 718).

Here, a capillary die of dimension 30 mm length with 2 mm diameter was used for these measurements while keeping the air gap (distance between die to first nip) at 100 mm. The melt strength of the branched polyesters at 200° C. is greater than 5 cN. Preferred melt strength of the branched polyesters at 200° C. is greater than 7 cN. The melt strength of the branched polyesters can be tailored by changing the amount of branching agent and the type of branching agent. Preferred amount of branching agent is greater than 0.1 weight %. Preferred range of branching agent is 0.5 weight % to 3 weight %.

In another preferred embodiment, the present invention is directed to a toner receiver layer consisting of polymer blends or mixtures of copolymers of polyolefin preferably polyethylene. The copolymers of polyethylene of interest for this invention are ethylene methyl acrylate copolymers (EMA); copolymer of ethylene, and glycidyl methacrylate ester (EGMA); terpolymer of ethylene, methyl acrylate and glycidyl methacryl ate ester (EMAGMA); terpolymer of ethylene butylacrylate and maleic anhydride (EBAMAH) ethylene vinyl acetate copolymers (EVA); ethylene methacrylic acid copolymers (EMAA); ethylene acrylic acid copolymers (EAA). The weight fraction of the copolymers used is between 5 wt %-50 weight %, preferably between 5 weight %-30 weight %. The weight fraction of the copolymers used in this invention to create the toner receiver layer is so chosen to optimize for absence of tack and good adhesion of the toner receiver layer to the base and good adhesion of the toner receiver layer to the toner. Another suitable set of polymers for the toner receiver layer of the present invention is directed to polymer blends or mixtures of polyamides, where the polyamide is preferably the dispersed phase. The polyamide can belong to the family of nylon-6, nylon-11, nylon-12, nylon-66, nylon-610, MXD6 etc. The volume fraction of polyamide is so chosen to satisfy the criteria of immiscible blends when creating the toner receiver layer. The preferred polyamide is nylon-6.

Besides polymers, the toner receiver layer contains any suitable white pigment, such as, for example, zinc oxide, zinc sulfide, zirconium dioxide, white lead, lead sulfate, lead chloride, lead aluminate, lead phthalate, antimony trioxide, white bismuth, tin oxide, white manganese, white tungsten, and combinations thereof. The preferred pigment is titanium dioxide ($TiO_2$) because of its high refractive index, which gives excellent optical properties at a reasonable cost. The pigment is used in any form that is conveniently dispersed within the polyolefin. The preferred pigment is anatase titanium dioxide. The most preferred pigment is rutile titanium dioxide because it has the highest refractive index at the lowest cost. The average pigment diameter of the rutile $TiO_2$ is most preferably in the range of 0.1 to 0.26 μm. The pigments that are greater than 0.26 μm are too yellow for an imaging element application and the pigments that are less than 0.1 μm are not sufficiently opaque when dispersed in polymers. Preferably, the white pigment should be employed in the range of from about 7 to about 50 percent by weight, based on the total weight of the polyolefin coating. Below 7 percent $TiO_2$, the imaging system will not be sufficiently opaque and will have inferior optical properties. Above 50 percent $TiO_2$, the polymer blend is not manufacturable.

The surface of the $TiO_2$ can be treated with an inorganic compounds such as aluminum hydroxide, alumina with a fluoride compound or fluoride ions, silica with a fluoride compound or fluoride ion, silicon hydroxide, silicon dioxide, boron oxide, boria-modified silica (as described in U.S. Pat. No. 4,781,761), phosphates, zinc oxide or, $ZrO_2$ and with organic treatments such as polyhydric alcohol, polyhydric amine, metal soap, alkyl titanate, polysiloxanes, or silanes. The organic and inorganic $TiO_2$ treatments can be used alone or in any combination. The amount of the surface treating agents is preferably in the range of 0.2 to 2.0% for the inorganic treatment and 0.1 to 1% for the organic treatment, relative to the weight of the titanium dioxide. At these levels of treatment, the $TiO_2$ disperses well in the polymer and does not interfere with the manufacture of the imaging support.

The polyolefin resins and $TiO_2$ and optional other additives for the toner receiver layer may be mixed with each other in the presence of a dispersing agent. Examples of dispersing agents are metal salts of higher fatty acids such as sodium palmitate, sodium stearate, calcium palmitate, sodium laurate, calcium stearate, aluminum stearate, magnesium stearate, zirconium octylate, or zinc stearate higher fatty acids, higher fatty amide, and higher fatty acids. The preferred dispersing agent is sodium stearate and the most preferred dispersing agent is zinc stearate. Both of these dispersing agents give superior whiteness to the resin coated layer.

In addition, it may be necessary to use various additives such as colorants, brightening agents, antistatic agents, plasticizers, antioxidants, slip agents, or lubricants, and light stabilizers in the resin coated supports as well as biocides in the paper elements. These additives are added to improve, among other things, the dispersibility of fillers and/or colorants, as well as the thermal and color stability during processing and the manufacturability and the longevity of the finished article. For example, the toner receiver layer coating may contain antioxidants such as 4,4'-butylidene-bis(6-tert-butyl-meta-cresol), di-lauryl-3,3'-thiopropionate, N-butylated-p-aminophenol, 2,6-di-tert-butyl-p-cresol, 2,2-di-tert-butyl-4-methyl-phenol, N,N-disalicylidene-1,2-diaminopropane, tetra(2,4-tert-butylphenyl)-4,4'-diphenyl diphosphonite, octadecyl 3-(3',5'-di-tert-butyl-4'-hydroxyphenyl propionate), combinations of the above, and the like; heat stabilizers, such as higher aliphatic acid metal salts such as magnesium stearate, calcium stearate, zinc stearate, aluminum stearate, calcium palmitate, zirconium octylate, sodium laurate, and salts of benzoic acid such as sodium benzoate, calcium benzoate, magnesium benzoate and zinc benzoate; light stabilizers such as hindered amine light stabilizers (HALS), of which a preferred example is poly{[6-[(1,1,3,3-tetramethylbutylamino}-1,3,5-triazine-4-piperidinyl)-imino]-1,6-hexanediyl[{2,2,6,6-tetramethyl-4-piperdinyl)imino]}(Chimassorb 944 LD/FL).

The toner receiver layer of the present invention also preferably contains a fuser-oil sorbent additive. Fuser-oil sorbent additives include adsorbents and absorbents and may be any suitable material. They have specific physical and chemical properties that allow them to capture the excess fuser-oil. Sorbent additives may be organic or inorganic and may be synthetic. Typical of such materials are clay, talc, glass wool, silica, peat moss, synthetic fibers such as nylon, plastic adsorbent microspheres and the like. The preferred material are clay and talc since they are readily available in a manner that can be easily formulated into coating dispersions for the toner receiver layer, can be obtained at a high brightness index and are inexpensive. The fuser-oil sorbent additives are present in an amount greater than 0.1 weight percent of the toner receiver layer and preferably from 2 to 15 weight percent of the layer. The amount of inorganic additive in the layer can also be used to control the level of mottle of the support when the support is paper and level of gloss in the imaged element, especially after belt fusing. The clays usable herein preferably have a GE brightness index greater than 88% and include various modified and unmodified clays including nanoclays. Brightness is the percent of blue light reflected of a sample measured at an effective wavelength of 457 nm. GE brightness is a directional brightness measurement utilizing essentially parallel beams of light to illuminate the paper surface at an angle of 45 degrees.

The clay materials suitable for the toner receiver layer of this invention include phyllosilicates, e.g., montmorillonite, particularly sodium montmorillonite, magnesium montmorillonite, and/or calcium montmorillonite, nontronite, beidellite, volkonskoite, hectorite, saponite, sauconite, sobockite, stevensite, svinfordite, vermiculite, magadiite, kenyaite, talc, mica, kaolinite (kaolin or china clay), and mixtures thereof. Preferred clays are swellable so that other agents, usually organic ions or molecules, can intercalate or exfoliate the layered material resulting in a desirable dispersion of the inorganic phase. The aforementioned clay can be natural or synthetic, for example, synthetic smectite clay. For this invention, the clay particles in the dispersed form should have a particle size where greater then 90% of the particles are less than or equal to 2 μm.

The clay, if used, in the toner receiver layer of this invention can be an organoclay. Organoclays are produced by interacting the unfunctionalized clay with suitable intercalants. These intercalants are typically organic compounds, which are neutral or ionic. Useful neutral organic molecules include polar molecules such as amides, esters, lactams, nitrites, ureas, carbonates, phosphates, phosphonates, sulfates, sulfonates, nitro compounds, and the like. The neutral organic intercalants can be monomeric, oligomeric or polymeric. Neutral organic molecules can cause intercalation in the layers of the clay through hydrogen bonding, without completely replacing the original charge balancing ions. Useful ionic compounds are cationic surfactants including onium species such as ammonium (primary, secondary, tertiary, and quaternary), phosphonium, or sulfonium derivatives of aliphatic, aromatic or arylaliphatic amines, phosphines and sulfides. Typically onium ions can cause intercalation in the layers through ion exchange with the metal cations of the preferred smectite clay. A number of commercial organoclays for example Cloisite 15A, a natural montmorillonite modified with a quaternary ammonium salt, are available from clay vendors, such as Southern Clay Products and Nanocor, which may be used in the practice of this invention.

The talcs useful in the toner receiver layer of this invention have a median size greater than 0.2 μm. The preferred sized range of talc is such that the median size is greater than 0.5 gm and less than 3 μm. The size distribution of the talcs are preferably narrow. Since talc is incorporated in the toner receiver layer, the preferred brightness of the talc is such that they have a GE brightness index greater than 88.

Besides specifying toner receiver layer characteristics, this invention teaches a method of forming a toner receiver member comprising providing a base extruding on at least one side a toner receiver layer, wherein said at least one toner receiver layer comprises a polymer blend where the preferred matrix resin is polyethylene and the other blend component is modified polyolefin like EMA, EMAGMA, EGMA, EAA etc. or a polyester like a branched polyester or polyamide. The thickness of the toner receiver layer can be between 10 μm to 50 μm. The invention may be practiced within a wide range of extrusion temperatures, for example, from 150° C. to 350° C., and speeds, for example, from 60 m/min. to 460 m/min. In order to enable extrusion processes like cast extrusion and extrusion coating, the choice of the toner receiver composition is further determined by melt strength of the blend or mixture. The overall melt strength of blend or mixture is important in order for a curtain or film or sheet of the toner receiver layer to be stable during the extrusion process as well as to enhance productivity by increasing line speeds while minimizing the amount of neck-in. The melt strength of a polymer is typically measured using a melt tension apparatus like Rheotens an apparatus provided by Gottfert (test described in detail earlier on). For this invention, a capillary die of dimension 30 mm length with 2 mm diameter was used for these measurements while keeping the air gap (distance between die to first nip) at 100 mm. Preferred melt strength of the overall toner receiver composition as taught by this invention needs to be greater than or equal to 2 cN at 200° C. The extrusion process also prefers resins with suitable melt viscosities that enable resin to redistribute in a die like a T slot die, and a coathanger die. Furthermore, for practicing this invention, preferred extrusion temperatures for the toner receiver layer are from 260° C. to 343.3° C. The preferred manufacturing method for the toner receiver layer is extrusion coating. In the extrusion coating process the polymer melt is forced through a die onto a moving web (in this invention it is the base) at the nip formed by the pressure roll and a large chill roll. This chill roll may be highly polished like have a mirror finish or could have a texture like matte finish. The pressure in the nip and temperature of chill roll determines the replication of the texture. Furthermore, the chill roll diameter is determined by many factors related to its capacity to cool. The teachings of the invention and other advantages of the invention will be apparent from the detailed description below.

The following examples illustrate the practice of this invention. They are not intended to be exhaustive of all possible variations of the invention. Parts and percentages are by weight unless otherwise indicated.

EXAMPLES

Examples 1-8 discuss the use of a resin coated paper as an electrophotographic imaging element. All the samples were created using a resin coating machine. This machine was operated at melt temperatures in the range 248.9° C.-337.8° C. The temperatures were adjusted based on requirements of adhesion to paper raw base, width of coating as well as restrictions imposed by resin degradation. The resins used have been characterized for rheology—viscosity using a rheometer and melt flow index (MFI). Melt flow index (MFI) is measured using ASTM D1238, for polyethylenes it translates to measurements made at 190° C. under a load of 2.16 kg. The samples were printed on the NexPress 2100 printer and some of them glossed using a glosser that consisted of a belt fuser which used a 76.2 micron polyimide belt. This belt was set at a temperature of around 165° C. Gloss measurements (60°) were made on the belt fused samples using a BYK Gardner Glossmeter in a Dmin (white) and Dmax (black area). The samples were tested for toner adhesion and physicals like caliper, basis weight, and stiffness. Toner adhesion was measured by a tape test. This test is a modification of ASTM D3359-02. In this test the toner receiver member is clamped on either side to a workbench. One end of a 3M Scotch magic 810 tape is adhered to at least 4" of the toner receiver surface, while the free end of the tape is removed rapidly at as close to a 180° peel angle as possible. Furthermore samples were evaluated for tack. Also, the surface of the resultant prints were evaluated for fuser oil smear by running a finger across the printed surface. The oil smear was visually assessed for presence or absence of it. Table 2 summarizes the learnings of the various examples discussed below. The $T_g$ and $T_m$ of the toner receiver was measured using thermal analysis instrument, a TA Instruments, Icc., Model Q-1000 differential scanning calorimeter. The heating rate was 10° C./min.

Example 1 (control) is representative of prior art and is presented here for comparison purposes. It comprises a photographic paper raw base made using standard fourdrinier paper machine utilizing a blend of mostly bleached hardwood Kraft fibers. The fiber consists primarily of bleached poplar, and maple/beech with lesser amounts of birch and softwood. Acid sizing chemical addenda utilized on a dry weight basis, included an aluminum stearate size, polyaminoamide epichlorhydrin, and polyacrylamide resin. Surface sizing using hydroethylated starch and sodium bicarbonate was also employed. This raw base was then extrusion coated on both sides using face side resin composite comprising substantially 87 weight % LDPE (Dow LDPE 5004I, a 4.15 MFI resin), 11.4 weight % $TiO_2$ and remaining additives. Resin coverages on both sides was 21.97 gm/$m^2$. This toner receiver member were evaluated for tack and then run through the NexPress 2100 machine. Some of the toner receiver members were also run through a glosser. The resultant image was evaluated for toner adhesion and presence of oil smear on the surface. The $T_g$ of polyethylene was found to be below −30° C.

Example 2 (blend of LDPE with EMA)) of the invention comprises a paper base of composition and caliper described in Example 1, which is then extrusion coated on both sides using an extrusion coating process with a toner image receiver layer on both sides of paper base. The total resin coating coverage was maintained at 21.97 gm/$m^2$ so as to give a caliper near equivalent to the control sample for the toner receiver member. The toner image receiver layer composition consisted of a blend of 14 weight % ethylene methyl acrylate (Exxon Mobil TC130, 21.5% methyl acrylate content) with 73.7 weight % low density polyethylene (Voridian 811A, a 20 MFI resin), 11.4 weight % $TiO_2$ and colorants, antioxidants and optical brighteners. These toner receiver members were evaluated for tack and then run through the NexPress 2100 machine. Some of the toner receiver members were also run through a glosser. The resultant image was evaluated for toner adhesion and presence of oil smear on the surface. The $T_g$ of the toner receiver resin blend of polyethylene and ethylene methyl acrylate was found to be below −30° C. The blend shows two $T_m$, one at 49.8° C. and another at 103.87° C.

Example 3 (blend of LDPE with EMAGMA) of the invention comprises a paper base of composition and caliper described in Example 1, which is then extrusion coated on both sides using an extrusion coating process with a toner image receiver layer on both sides of paper base. The total resin coating coverage was maintained at 21.97 gm/$m^2$ so as to give a caliper near equivalent to the control sample for the toner receiver member. The toner image receiver layer composition consisted of a blend of 14 weight % ethylene methyl acrylate glycidyl methacrylate ester (Atofina Lotader AX8900 a 6 MFI resin, 24% methyl acrylate content, and 8% glycidyl methacrylate ester content) with 73.7 weight % low density polyethylene (Voridian 811A, a 20 MFI resin), 11.4 weight % $TiO_2$ and colorants, antioxidants and optical brighteners. These toner receiver members were evaluated for tack and then run through the NexPress 2100 machine. Some of the toner receiver members were also run through a glosser. The resultant image was evaluated for toner adhesion and presence of oil smear on the surface. The $T_g$ of the toner receiver resin blend of polyethylene and ethylene methyl acrylate glycidyl methacrylate ester was found to be below −30° C. The toner receiver resin blend shows two $T_m$, one at 50.67° C. and another at 104.23° C.

Example 4 (blend of LDPE with branched polyester) of the invention comprises a paper base of composition and caliper described in Example 1, which is then extrusion coated on both sides using an extrusion coating process with a toner image receiver layer on both sides of paper base. The total resin coating coverage was maintained at 21.97 gm/$m^2$ so as to give a caliper near equivalent to the control sample for the toner receiver member. The toner image receiver layer composition consisted of a blend of 15 weight % branched polyester (made using 2% branching agent and $M_w$=124,000) with 85 weight % low density polyethylene (Voridian D4002P). The branched polyester was made using 2% branching agent. These toner receiver members were evaluated for tack and then run through the NexPress 2100 machine. Some of the toner receiver members were also run through a glosser. The resultant image was evaluated for toner adhesion presence of oil smear on the surface. The $T_g$ of the toner receiver blend was measured, and polyethylene's was found to be below −30° C. and that of branched polyester is 51.63° C.

Example 5 (blend of LDPE with nylon-6) of the invention comprises a paper base of composition and caliper described in Example 1, which is then extrusion coated on both sides using an extrusion coating process with a toner image receiver layer on both sides of paper base. The total resin coating coverage was maintained at 21.97 gm/$m^2$ so as to give a caliper near equivalent to the control sample for the toner receiver member. The toner image receiver layer composition consisted of a blend of 15 weight % nylon-6 (BASF Ultramid B3) with 85 weight % low density polyethylene (Voridian D4042P, a 10 MFI resin). This toner receiver member was evaluated for tack and then run through the NexPress 2100 machine. Some of the toner receiver members were also run through a glosser. The resultant image was evaluated for toner adhesion and presence of oil smear on the surface. The $T_g$ of the toner receiver blend was measured, and polyethylene was found to below below −30° C. and that of nylon was 49.44° C.

Example 6 (EMA) of the invention comprises a paper base of composition and caliper described in Example 1, which is then extrusion coated on both sides using an extrusion coating process with a toner image receiver layer on both sides of paper base. The total resin coating coverage was maintained at 21.97 gm/$m^2$ so as to give a caliper near equivalent to the control sample for the toner receiver member. The toner image receiver layer composition consisted of a blend of 82.6 weight % ethylene methyl acrylate (Exxon Mobil TC130, 21.5% methyl acrylate content) with 11.4 weight % $TiO_2$ and colorants, antioxidants and optical brighteners. These toner receiver members were evaluated for tack and then run through the NexPress 2100 machine. Some of the toner receiver members were also run through a glosser. The resultant image was evaluated for toner adhesion and presence of oil smear on the surface. The $T_g$ of the toner receiver layer made up of ethylene methyl acrylate was found to be below −30° C. The toner receiver member shows two $T_m$, one at 46.22° C. and another at 76.64° C.

Example 7 (blend of LDPE with EMA and talc) of the invention comprises a paper base of composition and caliper described in Example 1, which is then extrusion coated on both sides using an extrusion coating process with a toner image receiver layer on both sides of paper base. The total resin coating coverage was maintained at 21.97 gm/$m^2$ so as to give a caliper near equivalent to the control sample for the toner receiver member. The toner image receiver layer composition consisted of a blend of 14 weight % ethylene methyl acrylate (Exxon Mobil TC130, 21.5% methyl acrylate content) with 68.7 weight % low density polyethylene (Voridian 811A, a 20 MFI resin), 5 weight % talc (Imi Fabi HTP1C), 11.4 weight % $TiO_2$ and the rest colorants, antioxidants and optical brighteners. This toner receiver member was evaluated for tack and then run through the NexPress 2100 machine. Some of the toner receiver members were also run through a glosser. The resultant image was evaluated for toner adhesion and presence of oil smear on the surface.

Example 8 (blend of LDPE with EMAGMA and talc) of the invention comprises a paper base of composition and caliper described in Example 1, which is then extrusion coated on both sides using an extrusion coating process with a toner image receiver layer on both sides of paper base. The total resin coating coverage was maintained at 21.97 gm/$m^2$ so as to give a caliper near equivalent to the control sample for the toner receiver member. The toner image receiver layer composition consisted of a blend of 14 weight % ethylene methyl acrylate glycidyl methacrylate ester (Atofina Lotader AX8900, a 6 MFI resin, 24% methyl acrylate content, and 8% glycidyl methacrylate ester content) with 68.7 weight % low density polyethylene (Voridian 811A, a 20 MFI resin), 5 weight % talc (Imi Fabi HTP1C), 11.4 weight % $TiO_2$ and the rest colorants, antioxidants and optical brighteners. This toner receiver member was evaluated for tack and then run through the NexPress 2100 machine. Some of the toner receiver members were also run through a glosser. The resultant image was evaluated for toner adhesion and presence of oil smear on the surface.

Table 2 summarizes the performance of samples created in Examples 1-8. It is observed that the teachings of the invention enable toner adhesion to toner receiver layer. This is highlighted when comparing Example 1 with Examples 2-8. Furthermore comparing Examples 2-6 with Example 7-8 it is observed that incorporation of talc into the toner receiver layer of this invention enables oil sorption, and hence there is no oil smear on the toner receiver surface. Also a comparison of Example 2 with Example 6 shows the need for tailoring the toner receiver layer composition so as to prevent tack and eliminate potential blocking issues in a roll form or in a cut sheet form.

TABLE 2

| Example | Toner adhesion | Oil smear on toner receiver layer surface | Toner receiver layer tacky to touch |
|---|---|---|---|
| Example 1 (control) | No | Yes | No |
| Example 2 (LDPE + EMA) | Yes | Yes | No |
| Example 3 (LDPE + EMAGMA) | Yes | Yes | No |
| Example 4 (LDPE + branched polyester) | Yes | Yes | No |
| Example 5 (LDPE + polyamide) | Yes | Yes | No |
| Example 6 (EMA) | Yes | Yes | Yes |
| Example 7 (LDPE + EMA + talc) | Yes | No | No |
| Example 8 (LDPE + EMAGMA + talc) | Yes | No | No |

Table 3 highlights some of the toner receiver gloss values achievable after belt fusing the toner receiver layer formulations described in this invention. As it is observed the 60° gloss is higher than 60 in the non-imaged (Dmin) as well as in the imaged (Dmax) regions.

TABLE 3

| Example | Dmin Gloss @ 60° | Dmax Gloss @ 60° |
|---|---|---|
| Example 2 (LDPE + EMA) | 71.2 | 84.2 |
| Example 3 (LDPE + EMAGMA) | 62.2 | 84.5 |
| Example 4 (LDPE + branched polyester) | 64.7 | 81.7 |
| Example 7 (LDPE + EMA + talc) | 65.2 | 84.1 |

The invention has been described in detail with particular reference to certain preferred embodiments thereof, but it will be understood that variations and modifications can be effected within the spirit and scope of the invention.

The invention claimed is:

1. An imaged element comprising a receiver sheet for electrophotography comprising a base material having thereon at least one toner receiver layer comprising a mixture of polyolefin and at least one member selected from the group consisting of polyolefin copolymers, amide containing polymers, and ester containing polymers, wherein a measured $T_g$ of said at least one receiver layer is less than 5° C. wherein said at least one toner receiver layer has an image thereon formed from toner comprising pigment and bisphenol A polyester.

2. The imaged receiver sheet of claim 1 wherein said at least one said toner receiver layer further comprises a silicate material.

3. The imaged receiver sheet of claim 2 wherein said silicate material comprises between 3 and 10% by weight of said receiver layer.

4. The imaged receiver sheet of claim 2 wherein said silicate material comprises talc with a median particle size of less than 3 micron.

5. The imaged receiver sheet of claim 1 wherein said ester containing polymer comprises polyester.

6. The imaged polyester of claim 5 is a branched polyester.

7. The imaged receiver sheet of claim 1 wherein said ester containing polymer comprises acrylic.

8. The imaged receiver sheet of claim 1 wherein said ester containing polymer comprises a copolymer of polyethylene and acrylic.

9. The imaged receiver sheet of claim 1 wherein said polyolefin comprises polyethylene.

10. The imaged receiver sheet of claim 1 wherein said base comprises paper.

11. The imaged receiver sheet of claim 1 wherein said at least one toner receiver layer is applied directly to said base.

12. The imaged receiver sheet of claim 1 wherein a $T_g$ of said receiver layer is between −100° C. and +5° C.

13. The imaged receiver sheet of claim 1 wherein a $T_g$ of said receiver layer is between −10° C. and −100° C.

14. The imaged receiver sheet of claim 1 wherein said at least one toner receiver layer further comprises opacifier.

15. The imaged receiver sheet of claim 1 wherein said at least one toner receiver layer further comprises colorants.

16. The imaged receiver sheet of claim 1 wherein said at least one toner receiver layer has a thickness of between 6 and 25 micrometers.

17. The imaged receiver sheet of claim 1 wherein said at least one toner receiver layer has a ratio of viscosities of the said polyolefin and polyamide containing polymer that is less than the ratio of volume fraction of said polyolefin and volume fraction of said polyamide containing polymer.

18. The imaged receiver sheet of claim 5 wherein said at least one toner receiver layer has a ratio of viscosities of the said polyolefin and polyester containing polymer that is less than the ratio of volume fraction of said polyolefin and volume fraction of said polyester containing polymer.

19. The imaged receiver sheet of claim 6 wherein said at least one toner receiver layer is not tacky to touch.

20. The imaged receiver sheet of claim 1 wherein said ester containing polymer comprises between 5 and 30 weight % of the total weight of the toner receiver layer.

21. The imaged receiver sheet of claim 1 wherein said amide containing polymer comprises between 5 and 30 weight % of the total weight of the toner receiver layer.

22. The imaged receiver sheet of claim 1 wherein said mixture comprises polyolefin and a polyolefin copolymer.

23. The imaged receiver sheet of claim 1 wherein said mixture comprises polyolefin and amide containing polymers.

24. The imaged element of claim 1 wherein said element has a 60° gloss greater than 60 in non-imaged areas after belt fusing or calendering of said element.

* * * * *